United States Patent
Gamet

(10) Patent No.: US 12,061,333 B2
(45) Date of Patent: Aug. 13, 2024

(54) TWO-DIMENSIONAL MICRO-ELECTRICAL MECHANICAL SYSTEM MIRROR AND ACTUATION METHOD

(71) Applicant: Magic Leap, Inc., Plantation, FL (US)

(72) Inventor: Julien Gamet, Saint Point Lac (FR)

(73) Assignee: Magic Leap, Inc., Plantation, FL (US)

( * ) Notice: Subject to any disclaimer, the term of this patent is extended or adjusted under 35 U.S.C. 154(b) by 693 days.

(21) Appl. No.: 17/338,402

(22) Filed: Jun. 3, 2021

(65) Prior Publication Data

US 2021/0382299 A1    Dec. 9, 2021

Related U.S. Application Data

(60) Provisional application No. 63/034,884, filed on Jun. 4, 2020.

(51) Int. Cl.
*G02B 26/10* (2006.01)
*G02B 26/08* (2006.01)
*G03B 21/00* (2006.01)

(52) U.S. Cl.
CPC ......... *G02B 26/101* (2013.01); *G02B 26/085* (2013.01); *G03B 21/008* (2013.01)

(58) Field of Classification Search
None
See application file for complete search history.

(56) References Cited

U.S. PATENT DOCUMENTS

| | | | |
|---|---|---|---|
| 2,771,813 A | 11/1956 | Mihalyi | |
| 3,748,015 A | 7/1973 | Offner | |
| 6,392,811 B1 | 5/2002 | Lindau | |
| 6,856,446 B2 | 2/2005 | Dicarlo | |
| 6,989,921 B2 | 1/2006 | Bernstein et al. | |
| 7,071,594 B1 | 7/2006 | Yan et al. | |
| 8,531,750 B2 | 9/2013 | Kessler | |
| 8,817,379 B2 | 8/2014 | Saeedi et al. | |

(Continued)

FOREIGN PATENT DOCUMENTS

| | | |
|---|---|---|
| WO | 8203924 A1 | 11/1982 |
| WO | 2013110665 A1 | 8/2013 |

(Continued)

OTHER PUBLICATIONS

European Patent Application No. 21741743.5, "Extended European Search Report", Jun. 27, 2023, 5 pages.

(Continued)

*Primary Examiner* — Jennifer D. Carruth
(74) *Attorney, Agent, or Firm* — KILPATRICK TOWNSEND & STOCKTON LLP

(57) ABSTRACT

Described are two-dimensional scanning micromirror devices, scanning image display systems that incorporate a two-dimensional scanning micromirror device, and methods of projecting light using two-dimensional scanning micromirror devices. The disclosed two-dimensional scanning micromirror devices can be driven at or near the resonant oscillation frequency of the micromirror structure, which can result in lower power operation. In addition, by driving the micromirror structure at multiple different frequencies, the reflected light can be directed along a non-sinusoidal path, which can improve a tilt angle of the projected light compared with reflected light directed along a sinusoidal path.

20 Claims, 11 Drawing Sheets

(56) References Cited

U.S. PATENT DOCUMENTS

| | | | |
|---|---|---|---|
| 9,063,549 | B1 | 6/2015 | Pennecot et al. |
| 9,740,003 | B2 | 8/2017 | Potsaid et al. |
| 11,796,791 | B2 | 10/2023 | Gamet et al. |
| 2002/0050744 | A1 | 5/2002 | Bernstein et al. |
| 2005/0253055 | A1 | 11/2005 | Sprague et al. |
| 2007/0047105 | A1 | 3/2007 | Lerner et al. |
| 2007/0216982 | A1 | 9/2007 | Sanders et al. |
| 2007/0273794 | A1 | 11/2007 | Sprague et al. |
| 2009/0027748 | A1 | 1/2009 | Sprague et al. |
| 2009/0067033 | A1 | 3/2009 | Kajino et al. |
| 2009/0284816 | A1* | 11/2009 | Davis ................. G02B 26/0841 359/224.1 |
| 2011/0025930 | A1 | 2/2011 | Sprague et al. |
| 2011/0122101 | A1 | 5/2011 | Kurozuka |
| 2014/0268268 | A1 | 9/2014 | Kin et al. |
| 2016/0187643 | A1 | 6/2016 | Booth et al. |
| 2017/0102538 | A1 | 4/2017 | Gamet et al. |
| 2018/0176524 | A1 | 6/2018 | Kobori et al. |
| 2018/0299666 | A1 | 10/2018 | Nestorovic et al. |
| 2019/0278076 | A1 | 9/2019 | Chen et al. |
| 2019/0331774 | A1 | 10/2019 | Jackson |
| 2021/0191106 | A1 | 6/2021 | Sugimoto et al. |
| 2021/0223541 | A1 | 7/2021 | Gamet et al. |
| 2021/0227187 | A1 | 7/2021 | Stanley et al. |
| 2021/0382299 | A1 | 12/2021 | Gamet |

FOREIGN PATENT DOCUMENTS

| | | |
|---|---|---|
| WO | 2021146583 A1 | 7/2021 |
| WO | 2021150781 A1 | 7/2021 |

OTHER PUBLICATIONS

Application No. PCT/US2021/013676, "International Preliminary Report on Patentability", Jul. 28, 2022, 11 pages.

Application No. PCT/US2021/014455, "International Preliminary Report on Patentability", Aug. 4, 2022, 10 pages.

International Application No. PCT/US2021/013676, International Search Report and Written Opinion mailed on Apr. 8, 2021, 14 pages.

International Application No. PCT/US2021/014455, International Search Report and Written Opinion mailed on Apr. 9, 2021, 11 pages.

U.S. Appl. No. 17/150,694 , "Notice of Allowance", Jun. 20, 2023, 8 pages.

U.S. Appl. No. 17/154,965 , "Non-Final Office Action", Apr. 17, 2023, 11 pages.

U.S. Appl. No. 17/154,965, "Final Office Action", Oct. 17, 2023, 12 pages.

EP21744097.3, "Extended European Search Report", Jan. 5, 2024, 14 pages.

\* cited by examiner

TWO-DIMENSIONAL MICRO-ELECTRICAL MECHANICAL SYSTEM MIRROR AND ACTUATION METHOD

CROSS-REFERENCE TO RELATED APPLICATIONS

This application claims the benefit of and priority to U.S. Provisional Application No. 63/034,884, filed on Jun. 4, 2020, which is hereby incorporated by reference in its entirety.

BACKGROUND

Digital micromirror devices have been used in image projection systems. For example, U.S. Pat. No. 6,856,446 describes a micromirror array in which many individually hinged and controllable micromirror elements can be used to control the direction of reflected light to project an array of digital pixels. These devices often require use of a color wheel or three individual pixel arrays for different colors to project a full color image, and generally use large and high intensity light sources, limiting the compactness of the projection systems.

SUMMARY

The present disclosure relates to two-dimensional scanning micromirror devices and their use in image projection systems. The disclosed two-dimensional scanning micromirror devices are advantageously useful for driving reflected light in two directions, and can be considerably more compact than other reflective scanning systems. The disclosed two-dimensional scanning micromirror devices can make use of resonant oscillations to reduce or limit the power consumption by the devices, and can use structural geometries and materials to provide a specific set of ratios between different resonant oscillations in a way that can drive reflected light along a desirable path to reduce projection artifacts that can degrade the display of a projected image.

In a first aspect, two-dimensional scanning micromirror devices are disclosed. An example two-dimensional scanning micromirror device of this aspect comprises a base, a first platform coupled to the base by a plurality of first support flexures, and a second platform coupled to the first platform by a plurality of second support flexures, the second platform including a reflector. The first platform may be oscillatable about a first axis, which can be useful for controlling oscillations of reflected light in a first direction. The second platform may be oscillatable about a second axis orthogonal to the first axis, which can be useful for controlling oscillations of reflected light in a second direction, which can be orthogonal (e.g., perpendicular) to the first direction. The first platform, the second platform, and the plurality of second support flexures together may exhibit a first resonance having a first resonant frequency, with the first resonance corresponding to oscillatory motion of at least the first platform, the second platform, and the plurality of second support flexures about the first axis. The first platform, the second platform, and the plurality of second support flexures together may exhibit or further exhibit a second resonance having a second resonant frequency, with the second frequency being greater than the first frequency, and the second resonance corresponding to oscillatory motion of at least the second platform about the second axis. The first platform, the second platform, and the plurality of second support flexures together may exhibit or further exhibit a third resonance having a third resonant frequency, with the third frequency being double the second frequency, and the third resonance corresponding to oscillatory motion of at least the second platform about the first axis. In some examples, the third resonant frequency may be an integer or odd-integer multiple of the first resonant frequency. Use of a structure exhibiting such a suite of different frequencies of natural resonant oscillations can allow components of the two-dimensional scanning micromirror device to oscillate about different axes in a way that allows for advantageously controlling reflected light.

The support flexures can comprise resilient structures that allow for supporting various components from or by one another and coupling various components to one another, while allowing motion, which may be at least partially restricted to particular directions or about particular axes. In some examples, the first platform is suspended from the base by the plurality of first support flexures. In some examples, the second platform is suspended from the first platform by the plurality of second support flexures. Optionally, the first support flexures comprise resilient members having structures adapted for oscillatory motion of the first platform about the first axis at the first frequency. For example, the first support flexures can comprise meandering structures which can limit coupling of motion of the first platform to the base. Optionally, the second support flexures comprise resilient members having structures adapted for oscillatory motion of the second platform about the second axis at the second frequency and for oscillatory motion of the second platform about the first axis at the third frequency. For example, the second support flexures can comprise elongated structures that allow the second platform to move, at least in part, with the first platform about the first axis, but that also allow the second platform to oscillate about the second axis at least partially independent from the first platform.

The first platform or the second platform may be mechanically oscillatable, such as using one or more actuators, which may be electrostatic, piezoelectric, or electromagnetic, for example. In some examples, a two-dimensional scanning micromirror device of this aspect may further comprise an electrostatic or electromagnetic actuator coupled to the first platform or the second platform for inducing resonant oscillations of the first platform or the second platform. In cases where an electromagnetic actuator is used, the two-dimensional scanning micromirror device may optionally further comprise a magnetic field source arranged to provide a magnetic field oriented non-orthogonal with both the first axis and the second axis, such as a permanent magnet-based magnetic field source or an electromagnet-based magnetic field source. Optionally, a conducting coil can be used to actuate oscillatory motion of the first platform and/or the second platform, such as by passing an electric current through the conducting coil, which can be positioned within the magnetic field. For example, the second platform may comprise or include therein or thereon a conducting coil arranged to apply magnetic forces to the second platform about the first axis and about the second axis. With the magnetic field oriented at an angle (e.g., non-parallel and/or non-perpendicular) to the first axis and the second axis, the conducting coil may be used to apply forces to the second platform, which can advantageously induce motion about both the first axis and the second axis.

In another aspect, image projection methods are described herein. An example method of this aspect for projecting an image comprises providing a two-dimensional scanning micromirror device, such as any of the two-dimensional scanning micromirror devices disclosed herein; inducing a first resonant oscillation of the two-dimensional scanning micromirror device at a first frequency; inducing a second resonant oscillation of the two-dimensional scanning micromirror device at a second frequency, such as at a second frequency that is an integer multiple of the first frequency; inducing a third resonant oscillation of the two-dimensional scanning micromirror device at a third frequency, such as at a third frequency that is double the second frequency; and illuminating a reflector of the two-dimensional scanning micromirror device with a light source to generate reflected light.

The first resonant oscillation may correspond to oscillatory motion of a reflector of the two-dimensional scanning micromirror device about a first axis. The second resonant oscillation may correspond to oscillatory motion of the reflector about a second axis orthogonal to the first axis. The third resonant oscillation may correspond to oscillatory motion of the reflector about the first axis. Together, the first, second, and third resonant oscillations may be used together to direct reflected light for purposes of projecting an image. For example, the reflected light may be projected along a path that oscillates in a first direction perpendicular to the first axis and in a second direction perpendicular to the second axis. In a specific example, the path may be a non-sinusoidal path. The illumination of light from the light source may be modulated or controlled in time to provide, for example, pixel data at a specific location or set of locations of the reflected light at a projection plane.

As described above, a variety of different actuation techniques may be employed for inducing resonant oscillations. For example, inducing a resonant oscillation may comprise applying a driving signal to an electrostatic or electromagnetic actuator coupled to the two-dimensional scanning micromirror device. Inducing a resonant oscillation may comprise applying a driving signal to a conducting coil of the two-dimensional scanning micromirror device. The driving signal may have a periodic waveform characterized by a corresponding driving frequency or multiple driving frequencies, for example.

Optionally, a driving signal for inducing the first resonant oscillation, inducing the second resonant oscillation, and inducing the third resonant oscillation comprises a sum of: a first periodic waveform characterized by a first driving frequency, a second periodic waveform characterized by a second driving frequency, and a third periodic waveform characterized by a third driving frequency. For example, driving frequencies may be equal to or about equal to the natural resonant oscillatory frequencies of the two-dimensional scanning micromirror device. In a specific example, the first driving frequency may be equal to or about the first frequency, the second driving frequency may be equal to or about the second frequency, and the third driving frequency may be equal to or about the third frequency.

Driving the resonant oscillations of the two-dimensional scanning micromirror devices can be optimized or controlled so that the path of reflected light follows a non-sinusoidal shape. This may involve driving additional oscillation of the second platform about the first axis to diverge the path of the reflected light from a sinusoidal path, though the path may still be oscillatory in nature and comparable to a sinusoidal path, but may decrease a tilt angle for portions of the path compared to a sinusoidal path. This additional driving of the second platform may be in the same direction as the oscillation of the first platform about the first axis during some time periods, but it may be opposite to the oscillation of the first platform about the first axis during some other time periods.

In some examples, the first periodic waveform includes a first half-period and a second half-period, with the third periodic waveform phase shifted by 180 degrees during the first half-period relative to the second half-period. In some examples, the first periodic waveform includes a first half-period and a second half-period, and the third periodic waveform includes a first portion during part of the first half-period, a second portion during part of the second half-period, and a transition portion overlapping parts of the first half-period and the second half-period, with the transition portion and the second portion phase shifted by 180 degrees relative to the transition portion. The first portion and the second portion may both have a first amplitude, and the transition portion may have a second amplitude greater than the first amplitude. Optionally, the transition portion is a first transition portion, and the third periodic waveform further includes a second transition portion overlapping parts of the second half-period and a repeated first half-period. For example, the second transition portion may be phase shifted by 180 degrees relative to the first transition portion. The second transition portion may have the second amplitude.

In another aspect, image projection systems are described. The image projection systems described herein may be used in a variety of different display systems or projection systems. In one example, the image projection system may be used in a head-mounted projection system. An example image projection system of this aspect comprises a two-dimensional scanning micromirror device, such as any of the two-dimensional scanning micromirror devices described herein; and a light source arranged in optical communication with the reflector of the two-dimensional scanning micromirror device. Optionally, image projection systems may further comprise projection optics arranged in optical communication with the reflector of the two-dimensional scanning micromirror device to receive light from the light source reflected by the reflector. Example projection optics include, but are not limited to, mirrors, lenses, filters, or the like.

The image projection systems may further comprise a magnetic field source, such as a magnetic field source arranged to provide a magnetic field oriented non-orthogonal to axes of the two-dimensional scanning micromirror device, such as the first axis and the second axis described above. The image projection systems may further comprise a current source in electrical communication with a conductive coil of the two-dimensional scanning micromirror device, such as to apply one or more driving currents for inducing oscillation of platforms of the two-dimensional scanning micromirror device to drive reflected light along a particular path for displaying an image, such as along a non-sinusoidal oscillatory path.

Additional features, benefits, and embodiments are described below in the detailed description, figures, and claims.

DETAILED DESCRIPTION

Described herein are two-dimensional scanning micromirror devices, scanning image display systems that incorporate a two-dimensional scanning micromirror device, and methods of projecting light using two-dimensional scanning micromirror devices. The disclosed two-dimensional scanning micromirror devices can be driven at or near a resonant oscillation frequency or frequencies of the micromirror structure, which can result in lower power operation. In addition, by driving the micromirror structure at multiple different frequencies, the reflected light can be directed along a non-sinusoidal path, which can improve a tilt angle of the projected light, as described in more detail below.

Figure 1:
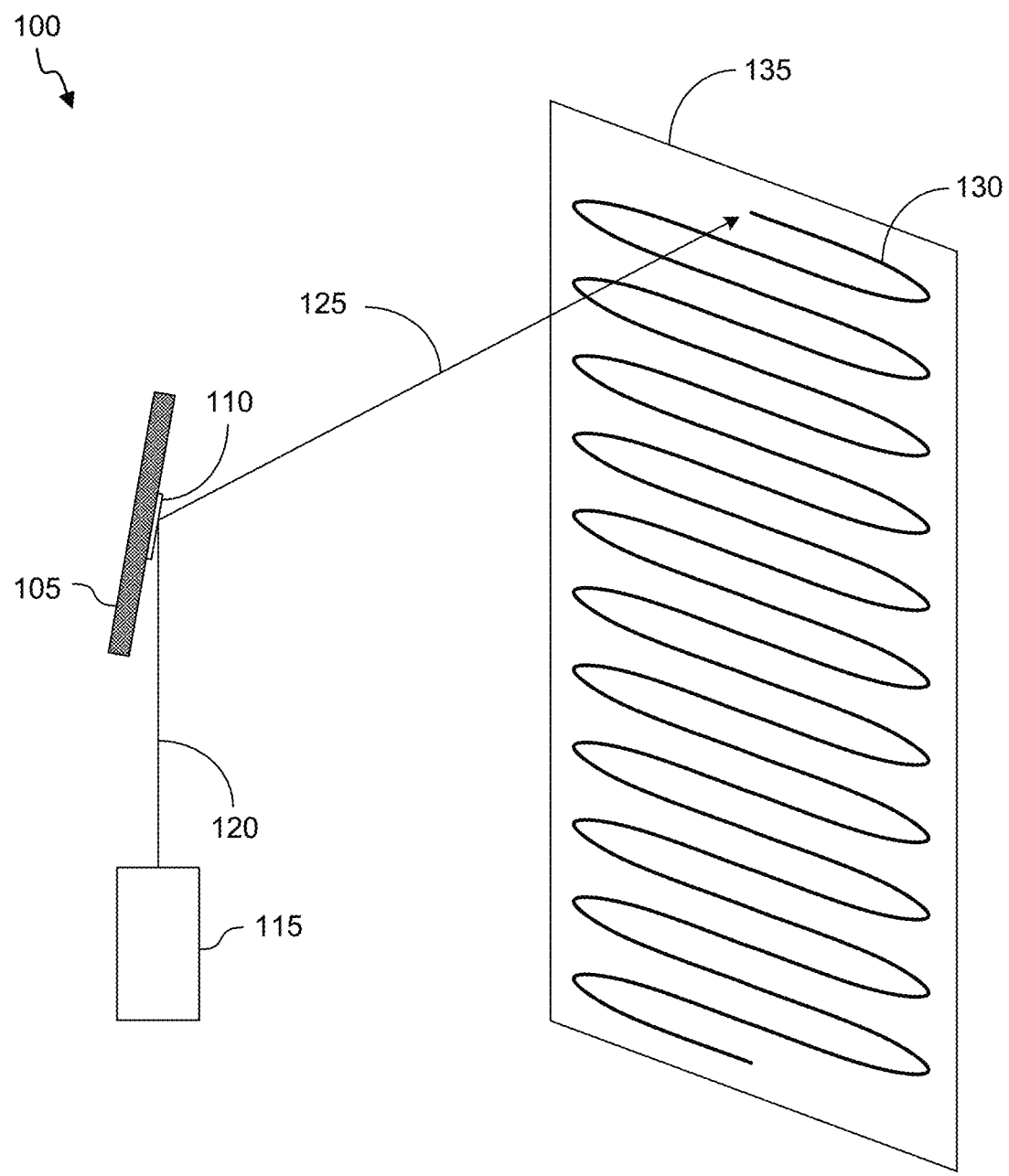
FIG. 1 provides a schematic illustration of an example image projection system.

FIG. 1 provides a schematic illustration of an example image projection system 100. Image projection system 100 comprises a two-dimensional scanning micromirror device 105, including reflector 110. Image projection system 100 also includes a light source 115 arranged in optical communication with reflector 110 to direct light 120 from light source 115 to reflector 110. Motion of two-dimensional scanning micromirror device 105 can be driven in such a way to direct reflected light 125 along a path 130 on a projection plane 135. By controlling the color, intensity, and timing of light 120 output by light source 115 with the oscillatory motion of two-dimensional scanning micromirror device 105, reflected light 125 along path 130 can form an image at projection plane 135.

For example, two-dimensional scanning micromirror device 105 can oscillate in two dimensions so that reflected light 120 can form a series of horizontal (left-to-right and right-to-left) passes that traverse vertically from top-to-bottom (and optionally from bottom-to-top) across projection plane 135. The oscillation frequency along the horizontal direction can be very fast, such as in the 1 kHz to 10 MHz range, for example. Some projection systems will use an oscillation pattern along the vertical direction that is a sawtooth or triangular shape, which can be useful for creating regularly spaced horizontal passes in one vertical direction (e.g., from top-to-bottom), where path 130 is sinusoidal in nature. The oscillation frequency along the vertical direction can be slower, such as in the 15-500 Hz range, for example. If only top-top-bottom repeated projections are desired, a blanking period can be used where no light is generated by light source 115 while two-dimensional scanning micromirror device 105 oscillates in the upward direction. In some cases, however, both top-to-bottom and bottom-to-top projections can be used. Blanking periods can also be used on the extremes of the horizontal dimension to avoid projection during periods where path 130 exhibits extreme curvature.

It will be appreciated that reference to horizontal (or left-to-right and right-to-left) and vertical (or bottom-to-top and top-to-bottom) directions are merely one example of labeling, referenced to the orientation of projection plane 135 shown in FIG. 1. Other configurations where horizontal and vertical direction labels are switched or where other labels are used are contemplated within the scope of the present disclosure.

Image projection system 100 can be a component of an optical projector, for example, which can be used to project still images or video images at a projection plane. In some cases, the image projection system 100 can be used to couple projected light into an eyepiece, such as an eyepiece of a head-mounted display device. Image projection system 100 can optionally include projection optics, such as mirrors, lenses, collimators, filters, waveguides, gratings, or the like, which are not illustrated in FIG. 1, but can be positioned in the optical path between the light source 115 and the projection plane 135, for example. Light source 115 can be a single or multi-color light source and can include a light emitting diode or laser source, which can be output switchable or modulatable at a rate of up to 100 MHz, for example.

Figure 2A:
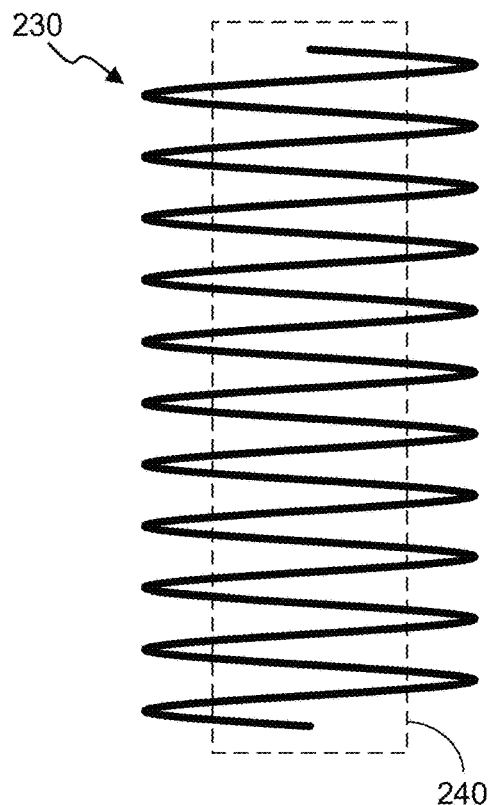
FIG. 2A shows an example sinusoidal shaped projection path and FIG. 2B shows an example sinusoidal shaped image display path.
Figure 2B:
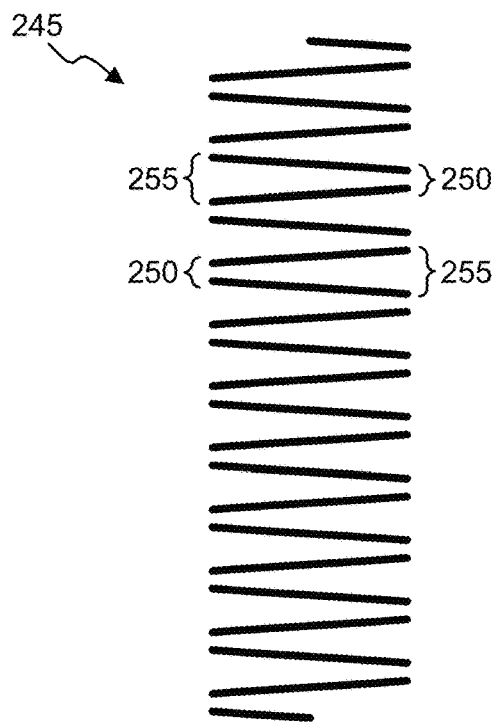

FIG. 2A shows a view of a projected path 230, where horizontal oscillation and motion along the vertical direction causes reflected light to take a path with a sinusoidal shape. As noted above, blanking can occur for regions of path 230 falling outside of a display window 240, resulting in an image display path 245 shown in FIG. 2B. With a sinusoidal shape for projected path 230, the image display path 245 has roughly linear left-to-right and right-to-left sections that are tilted at an angle (i.e., a non-zero angle from the horizontal), rather than absolutely or very close to horizontal. The faster the vertical motion, the greater the tilt will be. Tilt is undesirable for a number of reasons, including pixel paths that are not perfectly horizontal, which can distort the appearance of the projected image. Tilt can also result in the horizontal line spacing not being uniform, with alternating smaller 250 spacings and larger 255 spacings at the left/right edges of the display window 240. Decreasing the width of display window 240 can improve the uniformity of the smaller 250 and larger 255 spacings at the left/right edges of the display window 240, but this comes at the expense of a reduced field of view/projection width. Uniform spacing using a sinusoidal shaped projected path 230 can also be achieved by only using active projection in one horizontal direction, such as only left-to-right or only right-to-left, while the opposite direction would have a blanking period.

Figure 3A:
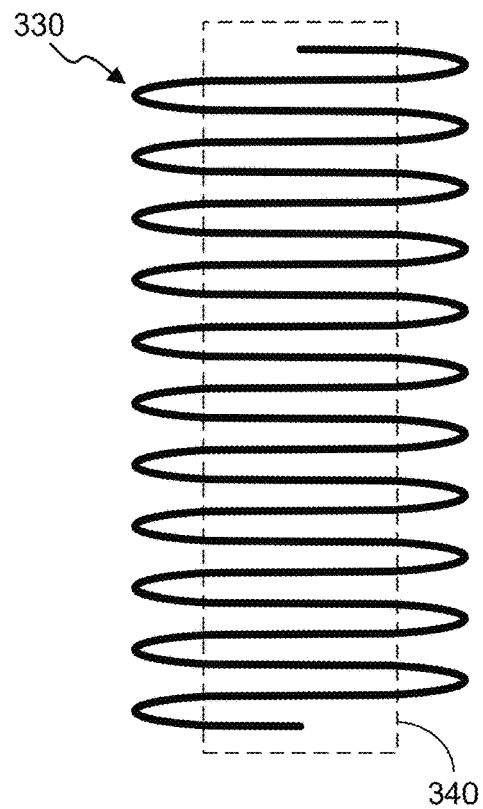
FIG. 3A shows an example non-sinusoidal shaped projection path and FIG. 3B shows an example non-sinusoidal shaped image display path.
Figure 3B:
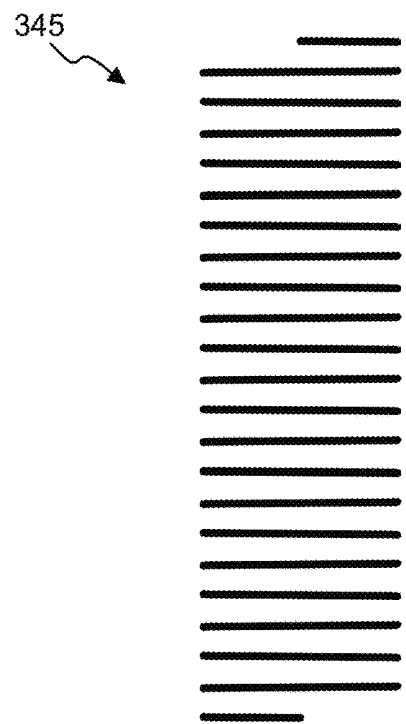

In contrast, when an oscillating, but non-sinusoidal path is used, the tilt can be reduced and horizontal line spacing can be better or more even, even while using both left-to-right motion and right-to-left motion. FIG. 3A shows a view of a projected path 330, where horizontal oscillation and motion along the vertical direction causes reflected light to take a path with a non-sinusoidal shape. Again, blanking can occur for regions of path 330 falling outside of a display window 340, resulting in an image display path 345 shown in FIG. 3B. Details for how to generate such a projected path 330 and image display path 345 are described in further detail below.

Figure 4:
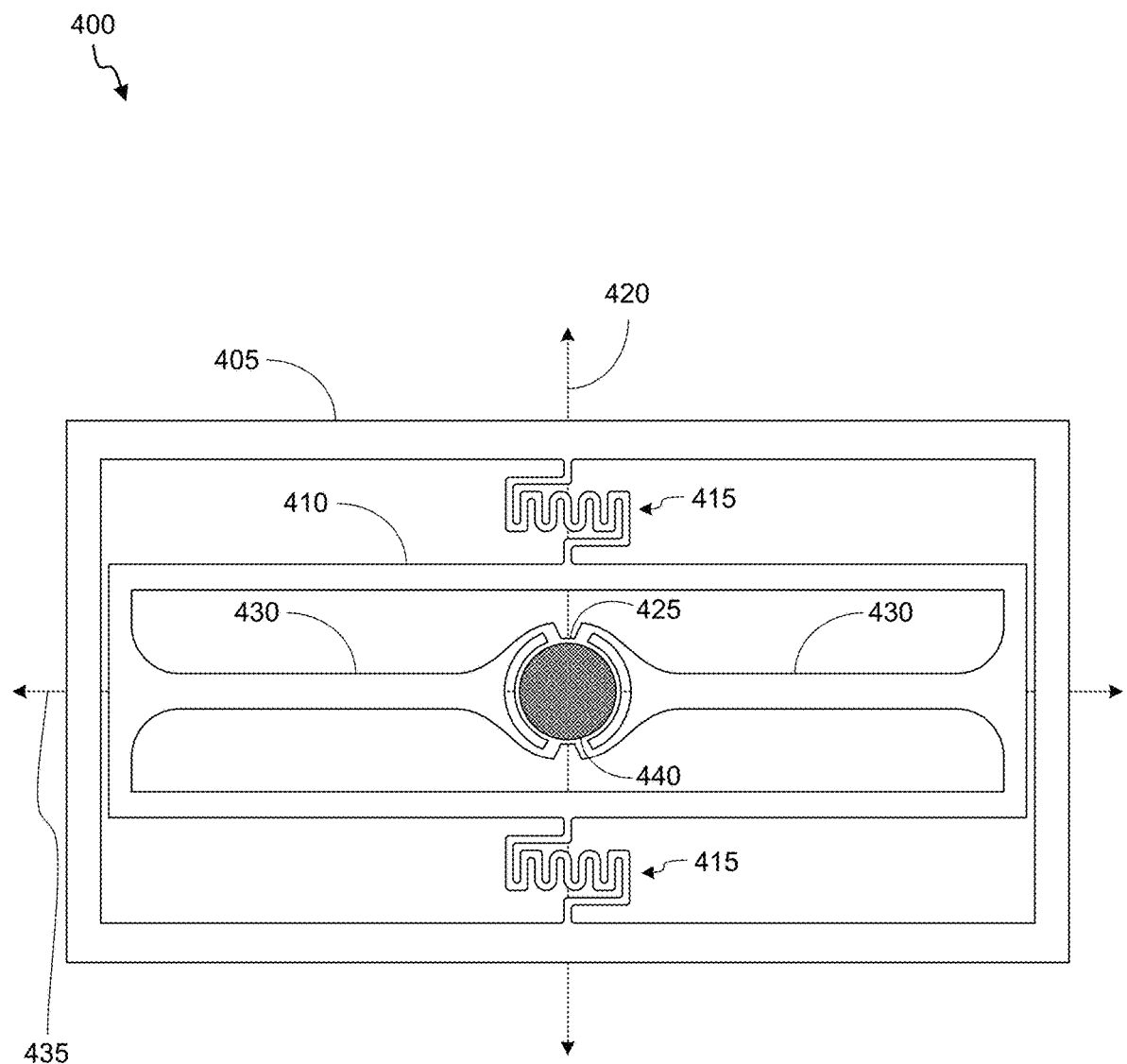
FIG. 4 provides an illustration of an example two-dimensional scanning micromirror device.

FIG. 4 provides an illustration of an example two-dimensional scanning micromirror device 400. Two-dimensional scanning micromirror device 400 can comprise silicon or other materials, allowing patterning and fabrication according to known microfabrication techniques. Two-dimensional scanning micromirror device 400 includes a base 405 and a first platform 410, which is coupled to base 405 by a plurality of first support flexures 415. First support flexures 415 are constructed and arranged to allow for oscillation of first platform 410 about first axis 420. Although base 405 is depicted in FIG. 4 as a frame surrounding other components, base 405 may extend in other directions, such as beneath first platform 410, for example.

Two-dimensional scanning micromirror device 400 also includes a second platform 425, which is coupled to first platform 410 by a plurality of second support flexures 430. Second support flexures 430 are constructed and arranged to allow for oscillation of second platform 425 about second axis 435. Second platform 425 includes a reflector 440, as depicted in FIG. 4. Useful materials for reflector 440 include, but are not limited to, metal reflectors and dielectric reflectors.

The components of two-dimensional scanning micromirror device 400, such as first platform 410, second platform 425, and second support flexures 430, can undergo oscillatory motion about first axis 420 and exhibit a first resonant frequency. Oscillatory motion about first axis 420 may generate vertical motion of light reflected from reflector 440, such as in the configuration shown in FIG. 1. The components of two-dimensional scanning micromirror device, such as at least second platform 425, can undergo oscillatory motion about second axis 435 and exhibit a second resonant frequency. Oscillatory motion about second axis 435 may generate horizontal motion of light reflected from reflector 440, such as in the configuration shown in FIG. 1. Higher frequency resonances of two-dimensional scanning micromirror device 400 components can also generate desirable oscillations about first axis 420, as described in further detail below, which can be useful for generating non-sinusoidal projection paths of light reflected from reflector 440.

It is desirable to induce oscillatory motion of the first platform 410 and second platform 425 at the natural resonant frequencies, though non-resonant operation is possible. Operation at the resonant frequencies can reduce power consumption versus operation at non-resonant frequencies, since the energy required to get the same displacement angle of the reflector 440 is much less when operating at resonance. For example, quality (Q) or amplification factors can be between 200 and 8000 for operation at resonance. In some cases, the two-dimensional scanning micromirror device 400 can be vacuum packaged, which can further increase the amplification factor by from 10 to 1000.

A variety of driving techniques may be employed for inducing oscillations of components of two-dimensional scanning micromirror device 400. For example, electrostatic actuation may be used, such as where conductive plates are included on various components of two-dimensional scanning micromirror device 400, such as on first platform 410 and/or second platform 425 and corresponding conductive plates, with opposite charge, are positioned adjacent to the plates included on two-dimensional scanning micromirror device 400 (e.g., on a base or support structure). In another example, piezoelectric actuation may be used, such as where piezoelectric components are included in two-dimensional scanning micromirror device 400, such as in first support flexures 415 and/or second support flexures 430 and a voltage is applied to the piezoelectric components to induce a change in geometry.

Figure 5:
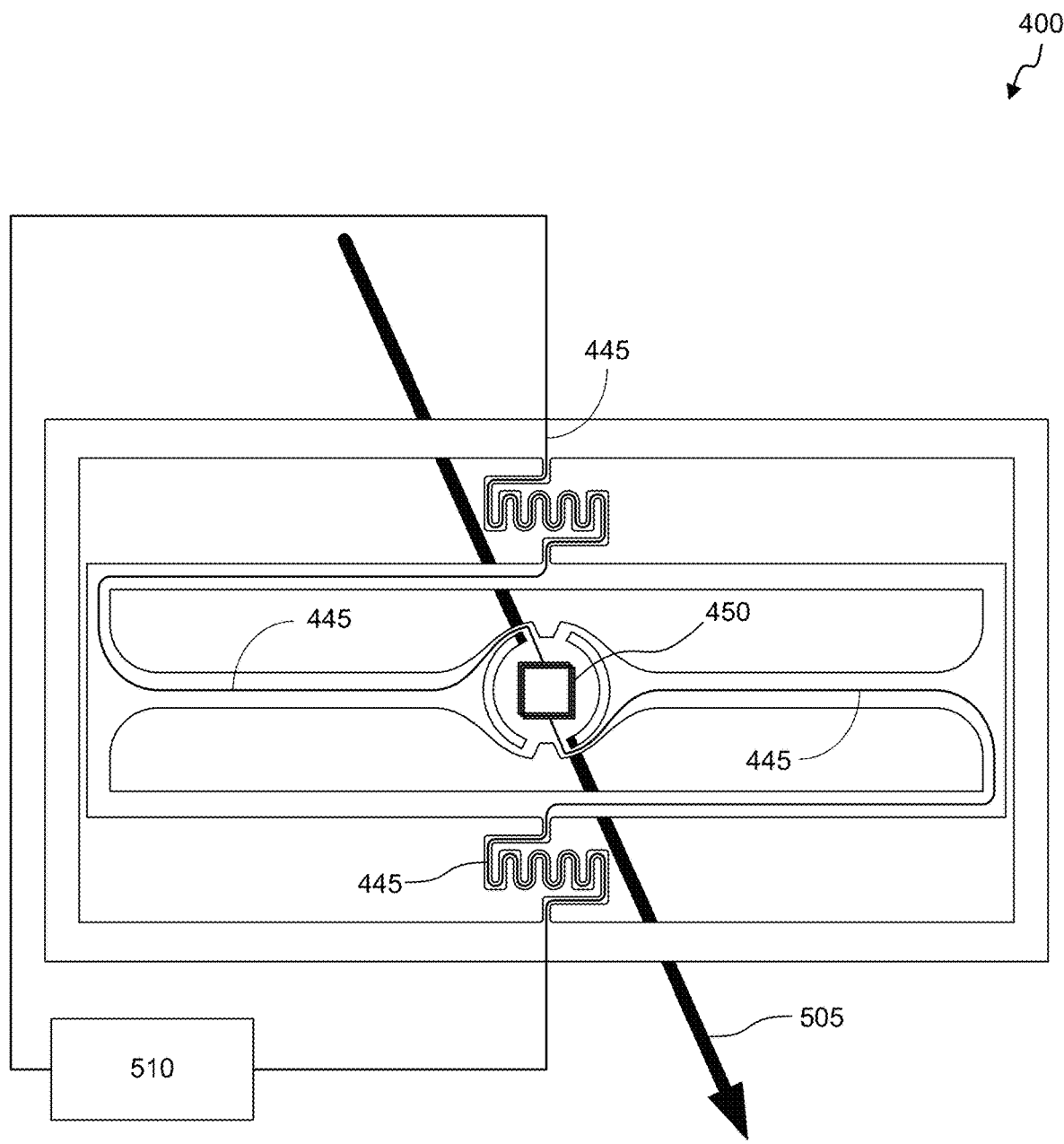
FIG. 5 provides an illustration of an example electromagnetic actuation mechanism for a two-dimensional scanning micromirror device.

Electromagnetic actuation may also be used, which may be advantageous for the systems described herein. In such a configuration an electric current may be passed through a device positioned within a magnetic field to impart forces to the device. Such a configuration is shown in FIG. 5, where two-dimensional scanning micromirror device 400 includes a conductive trace 445 and coil 450, and is positioned within a magnetic field 505, represented in FIG. 5 as an arrow showing a direction of the magnetic field lines associated with magnetic field 505. Magnetic field 505 may be oriented at an angle (e.g., a non-zero and non-perpendicular angle) with respect to the axes 420 and 435 of two-dimensional scanning micromirror device 400. So as not to obscure other details, reflector 440 and axes 420 and 435 of two-dimensional scanning micromirror device 400 are not depicted in FIG. 5. Conductive trace 445 and coil 450 can comprise any suitable conductive material. For example, conductive trace 445 and coil 450 can comprise a metal or a doped semiconductor, for example. Conductive trace 445 and coil 450 can be positioned at a top surface of two-dimensional scanning micromirror device 400, at a bottom surface of two-dimensional scanning micromirror device 400, or within two-dimensional scanning micromirror device 400. In some configurations, conductive trace 445 and coil 450 are positioned at bottom surface of two-dimensional scanning micromirror device 400 so as avoid disturbing or interaction with reflector 440, which may be positioned on a top surface of second platform 425, for example.

Interaction of current flowing through conductive trace 445 and coil 450, provided by current source 510, and magnetic field 505 can induce forces in two-dimensional scanning micromirror device 400 and drive oscillation of components thereof, such as first platform 410 and second platform 425. The construction of coil 450 can result in the majority of the electromagnetic forces being applied at second platform 425, while only minimal electromagnetic forces are applied due to the current in conductive trace 445. It will be appreciated that the current source 510 is shown in block diagram format in FIG. 5 to show the relative electrical configuration and that conductive trace 445 is just one example to show one electrical configuration for application of current to coil 450. Coil 450 can be constructed with any suitable number of turns, depending on the geometry, materials, etc. of two-dimensional scanning micromirror device 400.

Since magnetic field 505 is oriented at an angle (e.g., a non-zero and non-perpendicular angle) with respect to the axes 420 and 435 of two-dimensional scanning micromirror device 400, a current in coil 450 can impart forces in different directions at different locations in second platform 425. FIGS. 6A, 6B, 8A, and 8B show views of two-dimensional scanning micromirror device 400 to show the direction of electromagnetic forces arising through magnetic field 505 and current in coil 450. Coil 450 can be constructed with any desirable shape (e.g., round, oval, rectangular, regular polygon, irregular polygon, etc.), but a square shape is shown to simplify the explanation of the generation and application of electromagnetic forces. The current flowing in coil 450 will interact with magnetic field 505 and generate forces in perpendicular directions to the direction of current flow and the magnetic field. Force on a current carrying wire can be determined using the equation F=IL×B, where I is the current, L is the wire length, and B is the magnetic field. Since the current on opposite sides of the coil flows in opposite directions relative to one another, the electromagnetic forces applied at the coil will also be in opposite directions on opposite sides of the coil. For example, for current flowing in coil 450 in a clockwise direction in the orientation depicted in FIG. 5, the current will be flowing down in the right segments of coil 450, but up in the left segments of coil 450. Similarly, the current will be flowing to the right in the top segments of coil 450, but to the left in the bottom segments of coil 450. Since magnetic field 505 is oriented at an angle (e.g., a non-zero and non-perpendicular angle) with respect to both axes 420 and 435, magnetic field 505 will have components both parallel and perpendicular to the different segments of coil 450, giving rise to perpendicular electromagnetic forces at each segment of coil 450 when current is flowing.

Figure 6A:
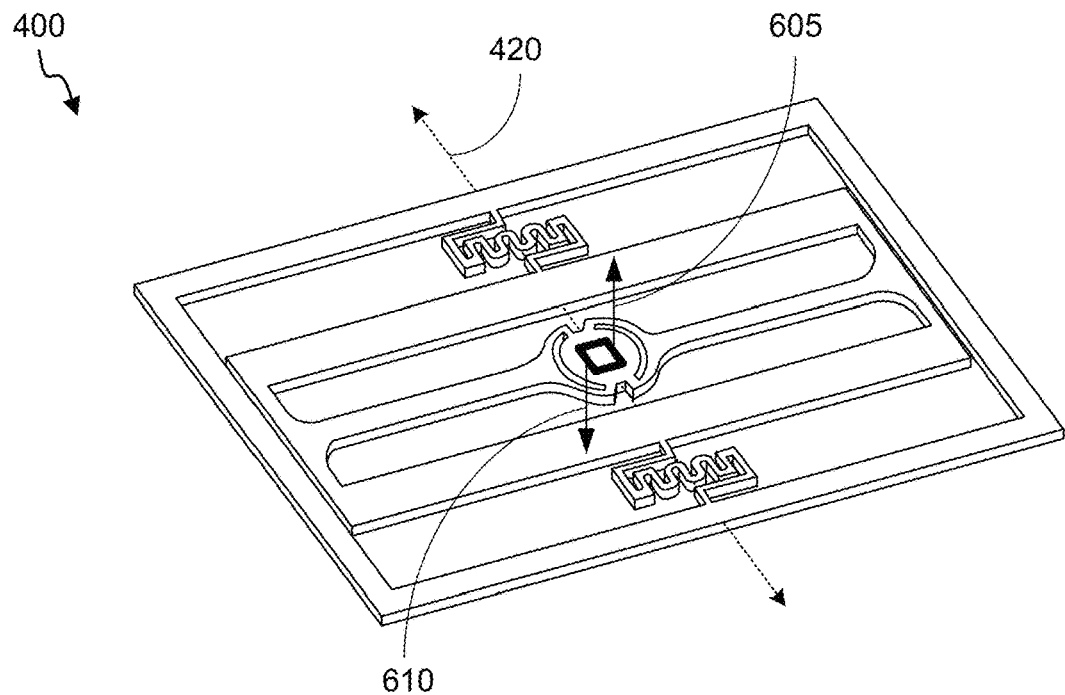
FIG. 6A and FIG. 6B provide illustrations of forces on two-dimensional scanning micromirror device generated by an example electromagnetic actuation mechanism for inducing resonant oscillations of a two-dimensional scanning micromirror device about a first axis.
Figure 6B:
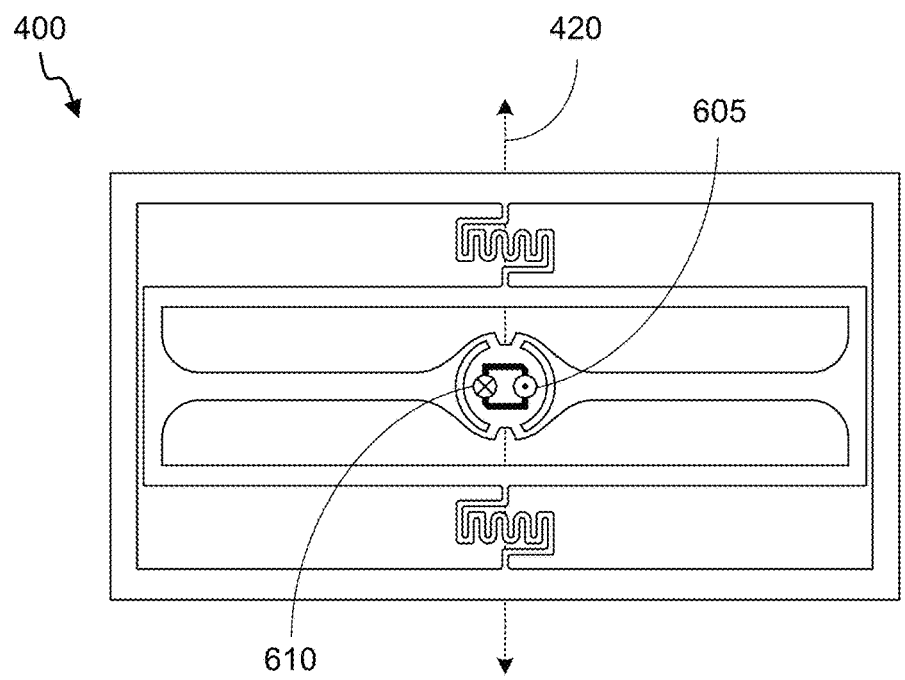

As shown in FIG. 6A, the electromagnetic force 605 on the left side of coil 450 and the electromagnetic force 610 on the right side of coil 450 will be perpendicular, but in opposite directions, to the second platform, positioned at the location of the left and right segments of coil 450. Such forces can apply a rotational force about first axis 420. If the current changes in time (i.e., is an alternating current), the forces can also change in time, and are useful for driving oscillations of components of two-dimensional scanning micromirror device 400. When the current changes in time at the same frequency as a natural resonant frequency of two-dimensional scanning micromirror device 400, the two-dimensional scanning micromirror device 400 can be driven to oscillate at its resonant frequency. FIG. 6B shows an overhead view to aid in depiction of electromagnetic forces 605 and 610.

Figure 7:
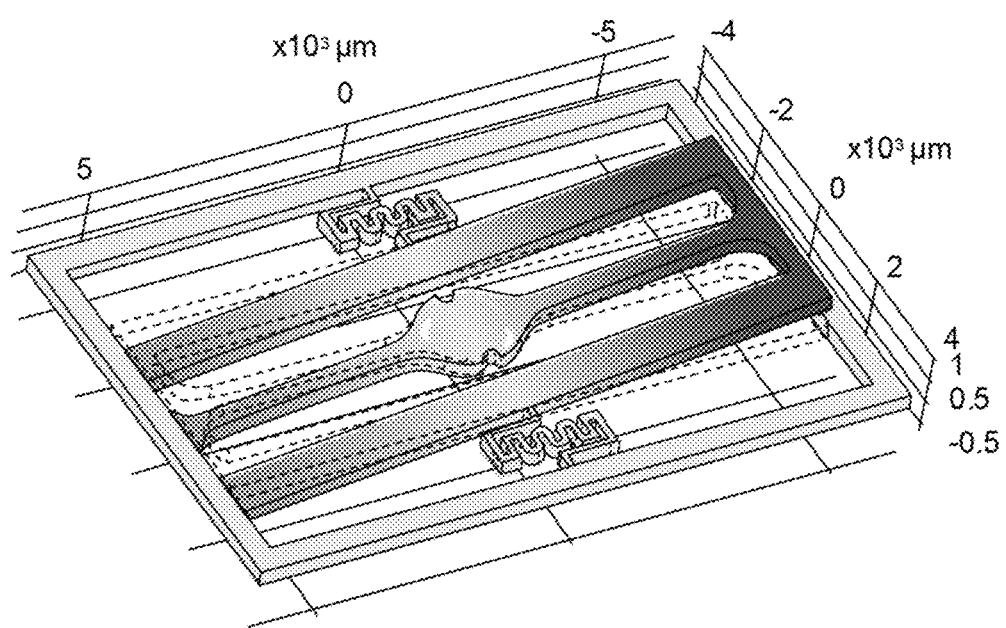
FIG. 7 shows a schematic illustration of a two-dimensional scanning micromirror device providing analytical results identifying motion at a natural resonance.

FIG. 7 shows a schematic illustration of a two-dimensional scanning micromirror device, showing analytical results identifying motion at a natural resonance. Here the motion generally corresponds to first platform 410, second platform 425, and second support flexures 430 rotating about first axis 420, which indicates that the forces applied by coil 450, as depicted in FIG. 6A and FIG. 6B, are in appropriate directions to drive oscillation at the natural resonant frequency.

Figure 8A:
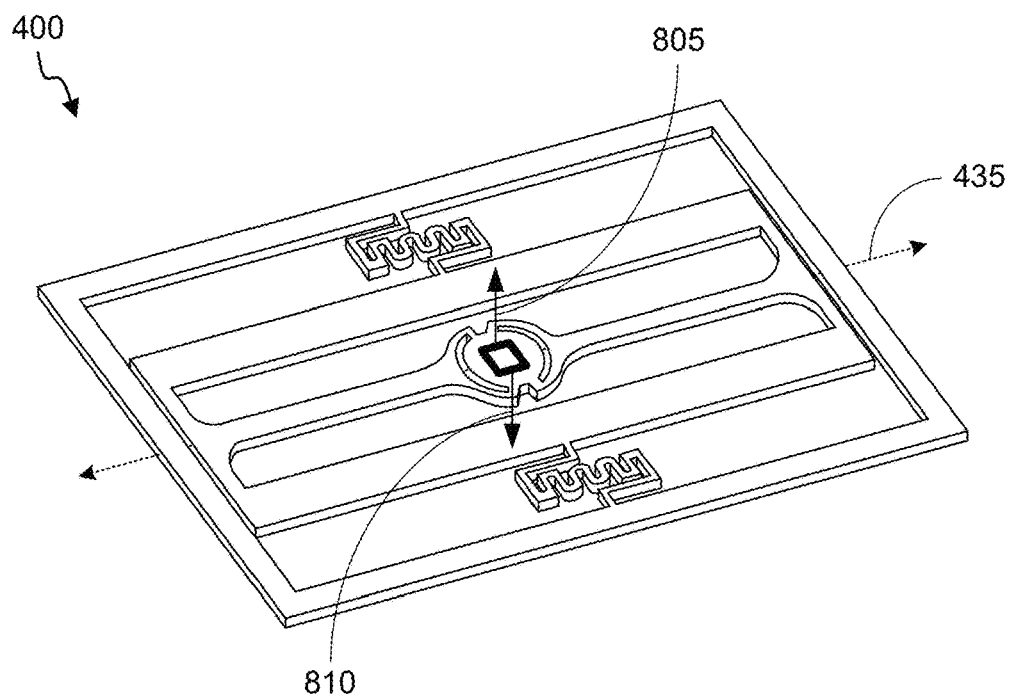
FIG. 8A and FIG. 8B provide illustrations of forces on two-dimensional scanning micromirror device generated by an example electromagnetic actuation mechanism for inducing resonant oscillations of a two-dimensional scanning micromirror device about a second axis.
Figure 8B:
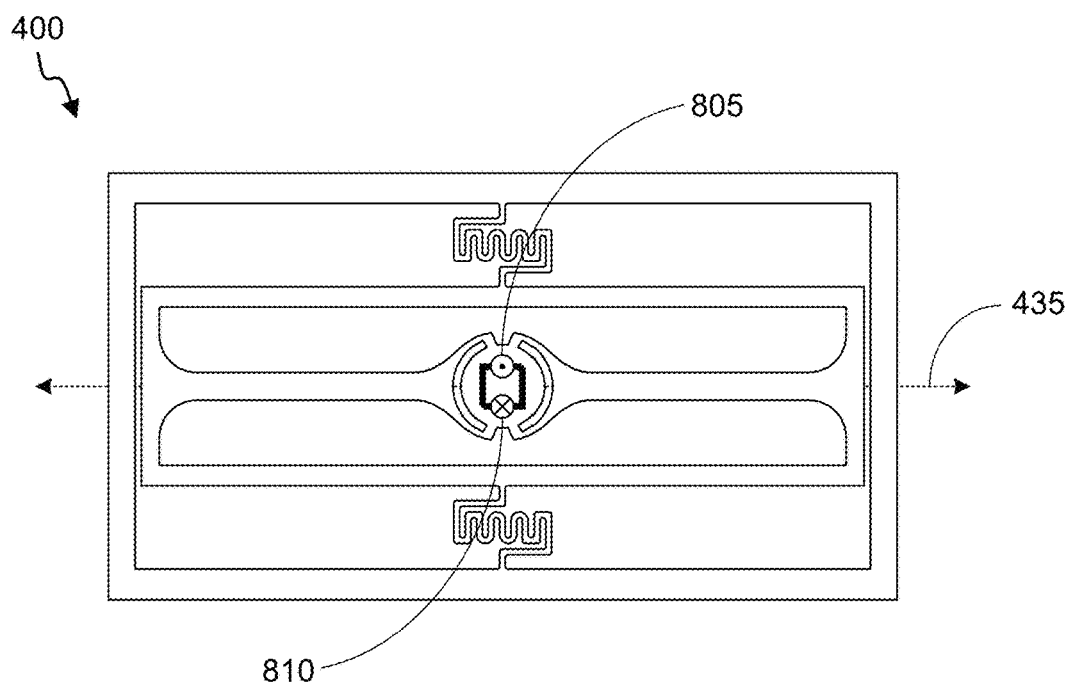

As shown in FIG. 8A, the electromagnetic force 805 on the top side of coil 450 and the electromagnetic force 810 on the bottom side of coil 450 will be perpendicular, but in opposite directions, to the second platform, positioned at the location of the top and bottom segments of coil 450. Such forces can apply an oscillatory force about second axis 435. Again, if the current changes in time at the same frequency as a natural resonant frequency of two-dimensional scanning micromirror device 400, the two-dimensional scanning micromirror device 400 can be driven to oscillate at its resonant frequency. FIG. 8B shows an overhead view to aid in depiction of electromagnetic forces 805 and 810.

Figure 9:
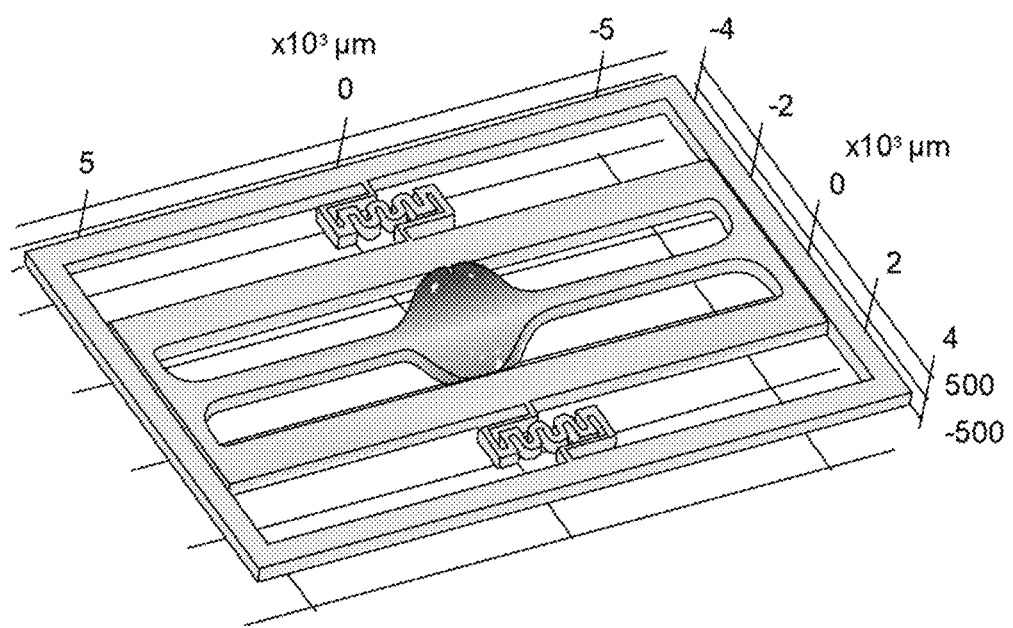
FIG. 9 shows a schematic illustration of a two-dimensional scanning micromirror device providing analytical results identifying motion at a natural resonance higher in frequency than that depicted in FIG. 7.

FIG. 9 shows a schematic illustration of a two-dimensional scanning micromirror device, showing analytical results identifying motion at another natural resonance. Here the motion generally corresponds second platform 425 rotating about second axis 435, which indicates that the forces applied by coil 450, as depicted in FIG. 8A and FIG. 8B, are in appropriate directions to drive oscillation at the natural resonant frequency. Advantageously, the frequency of the natural resonant oscillation depicted in FIG. 9 can be an integer or odd integer multiple of the frequency of the natural resonant oscillation depicted in FIG. 7, which can be achieved through selection of the geometry, materials, etc., of two-dimensional scanning micromirror device 400.

The oscillations at only the natural resonances schematically depicted in FIGS. 7 and 9 would generally result in a sinusoidal path for light reflected from reflector 440, similar to the depiction in FIG. 2A. However, as described above, a sinusoidal path may not be optimal, as such a configuration may result in uneven line spacing or a significant tilt angle, as described above with respect to FIGS. 2A and 2B. To achieve a non-sinusoidal path for light reflected from reflector 440, an additional, higher frequency resonance of two-dimensional scanning micromirror device 400 can be activated. It is advantageous that the higher frequency resonance have a frequency double that of the resonant oscillation about the second axis 435 but include motion of the second platform 425 about first axis 420, in order to reduce the tilt angle in time with the resonant oscillation about the second axis 435 and even out line spacing on the path for light reflected from reflector 440.

Figure 10:
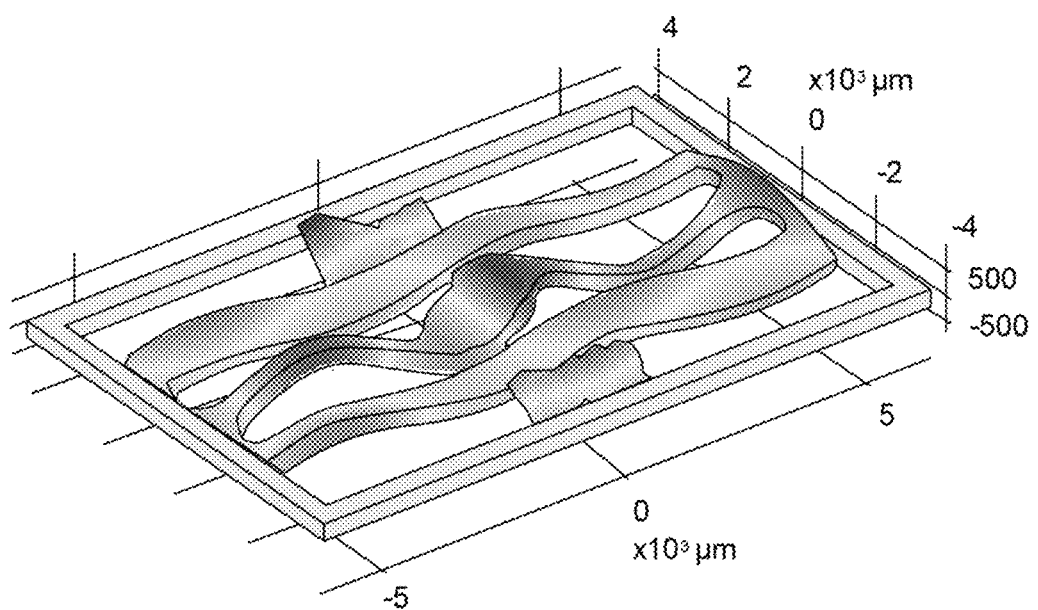
FIG. 10 shows a schematic illustration of a two-dimensional scanning micromirror device providing analytical results identifying motion at a natural resonance with double the frequency of that depicted in FIG. 9.

The configuration (e.g., geometry, materials, etc.) of two-dimensional scanning micromirror device 400 can be selected such that another natural resonance of two-dimensional scanning micromirror device 400, with a resonant frequency double that of the natural resonant oscillation depicted in FIG. 9, can include motion about first axis 420. FIG. 10 shows a schematic illustration of a two-dimensional scanning micromirror device, showing analytical results identifying motion at another natural resonance, having a resonant frequency double that of the natural resonant oscillation depicted in FIG. 9. Here the motion includes a significant component where the second platform rotates about first axis 420, which indicates that the forces applied by coil 450, as depicted in FIG. 6A and FIG. 6B, are in appropriate directions to drive oscillation at the natural resonant frequency.

Figure 11:
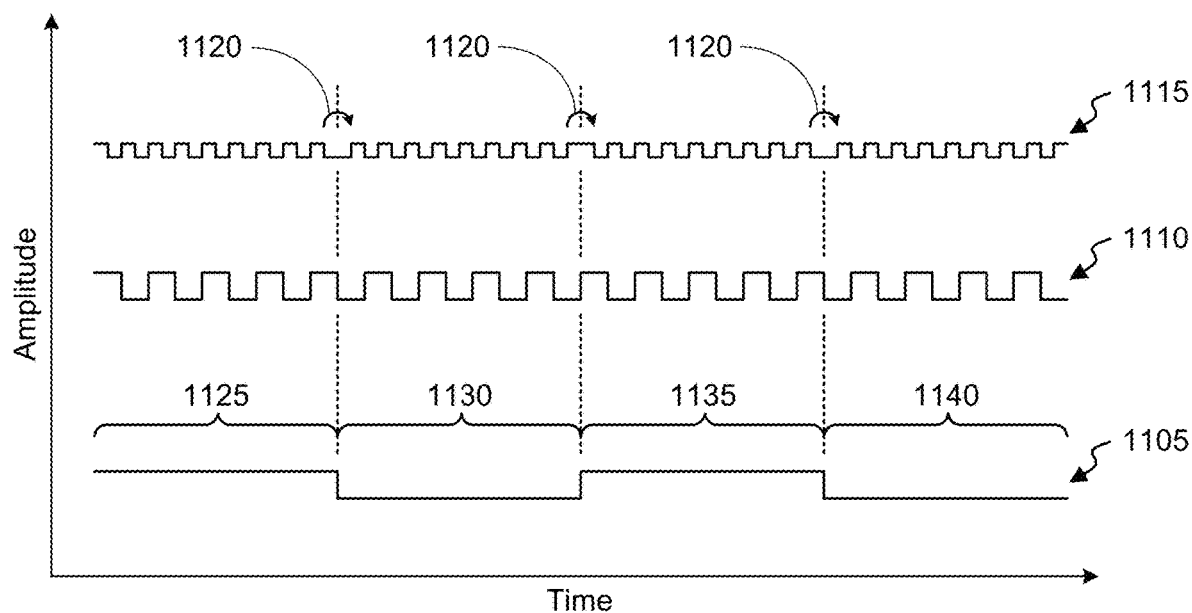
FIG. 11 provides a plot showing example driving signals for inducing resonant oscillations in a two-dimensional scanning micromirror device.

Accordingly, currents can be flowed through coil 450 to drive the natural resonant oscillations to induce motion about first axis 420 and second axis 435 to achieve a non-sinusoidal scan pattern for light reflected from reflector 440, as described above with respect to FIGS. 3A and 3B. FIG. 11 provides a plot showing example driving currents to induce oscillations at the natural resonances described above, represented as periodic waveforms. A first periodic waveform 1105 represents the current used to induce oscillation of the first platform 410, second platform 425, and second support flexures 430 about first axis 420, such as depicted in FIG. 7. A second periodic waveform 1110 represents the current used to induce oscillation of the second platform 425 about second axis 435, such as depicted in FIG. 9. A third periodic waveform 1115 represents the current used to induce additional oscillation of the second platform 425 about first axis 410, such as depicted in FIG. 10.

In FIG. 11, the illustrated amplitudes of first periodic waveform 1105, second periodic waveform 1110, and third periodic waveform 1115 are arbitrary and do not represent any particular relationship between the amplitudes. The timing of the oscillations of first periodic waveform 1105, second periodic waveform 1110, and third periodic waveform 1115 depicted in FIG. 11 is intended to be instructive to show certain aspects. Here, the frequency of second periodic waveform 1110 is an integer multiple of the frequency of first periodic waveform 1105, and it may optionally be an odd-integer multiple. The frequency of third periodic waveform 1115 is double the frequency of the second periodic waveform 1110. To induce simultaneous oscillations, the currents can be applied as a summation with independent amplitudes that can be optimized for a particular configuration. It will be appreciated that the specific frequencies illustrated in FIG. 11 are merely examples for purposes of illustrating various operational and configurational principles and do not represent the actual frequencies during operation of two-dimensional scanning micromirror device 400. For example, the frequency of second periodic waveform 1110 is depicted in FIG. 5 as being 9× the frequency of first periodic waveform 1105, but in operation the actual ratio of these frequencies may be much larger, such as from 20× to 10000× or more.

Third periodic waveform 1115 includes a feature where there is a 180 degree phase shift 1120 every half-period of the first periodic waveform 1105. For example, FIG. 11 identifies a first half-period 1125, a second half-period 1130, a repeated first half-period 1135, and a repeated second half-period 1140 for first periodic waveform 1105. Third period waveform 1115 undergoes a 180 degree phase shift 1120 at the transition between first half-period 1125 and second half-period 1130, at the transition between second half-period 1130 and repeated first half-period 1135, at the transition between repeated first half-period 1135 and repeated second half-period 1140, and so on. Such a 180 degree phase shift 1120 is useful since the motion of the first platform 140 during the first half-periods of first periodic waveform 1105 (i.e., first half-period 1125, repeated first half-period 1135, etc.), is opposite that during the second half-periods (second half-period 1130, repeated second half-period 1140, etc.). For example, during the first half-periods of first periodic waveform 1105 first platform can move in a direction where light reflected from reflector 440 moves in a top-to-bottom motion, while during the second half-period of first periodic waveform 1105 first platform can move in a direction where light reflected from reflector 440 moves in a bottom-to-top motion.

By including 180 degree phase shift 1120 in third periodic waveform 1115 at the transition of every half-period of first periodic waveform 1105, the oscillations of second platform 425 about first axis 420 can be timed to be in the correct direction of travel to achieve a desirable non-sinusoidal oscillation of the scan pattern for light reflected from reflector 440. However, making an immediate 180 degree phase shift at the end of a half-period may not result in the most optimal configuration, since the second platform 425 cannot immediately transition to a phase-shifted oscillation.

Figure 12:
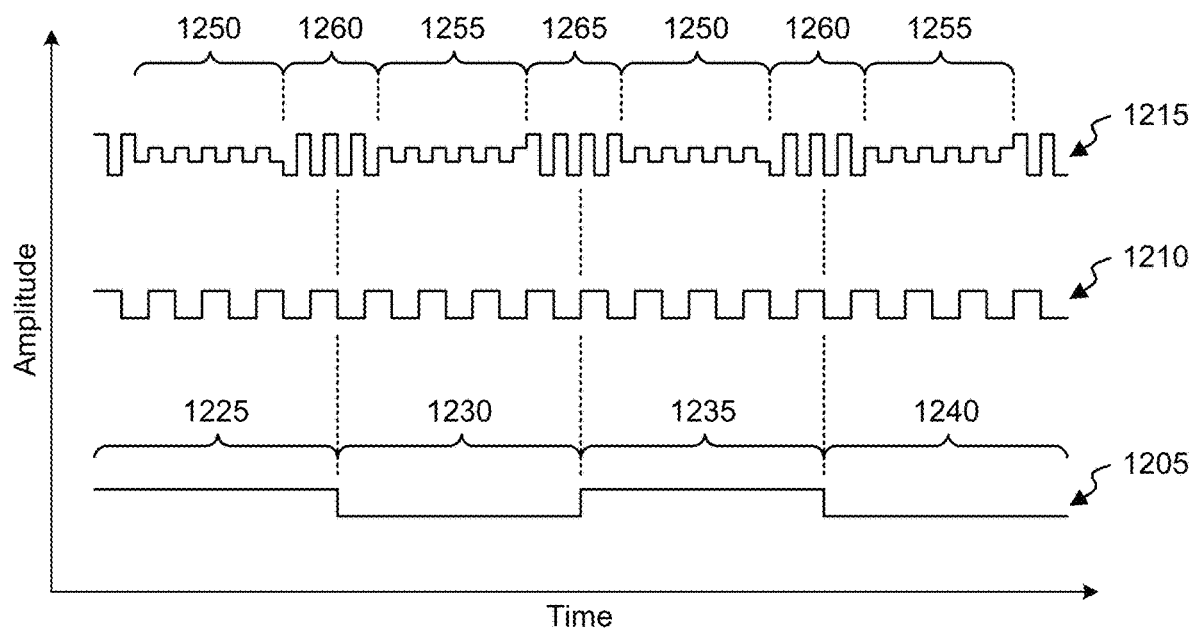
FIG. 12 provides a plot showing example driving signals for inducing resonant oscillations in a two-dimensional scanning micromirror device.

To improve the transitioning of the oscillatory motion of second platform 425 to a phase-shifted oscillation, the 180 degree phase shift can begin before the end of a half-period. FIG. 12 provides a plot showing example driving currents to induce oscillations at the natural resonances described above, represented as periodic waveforms. A first periodic waveform 1205 represents the current used to induce oscillation of the first platform 410, second platform 425, and second support flexures 430 about first axis 420, such as depicted in FIG. 7. A second periodic waveform 1210 represents the current used to induce oscillation of the second platform 425 about second axis 435, such as depicted in FIG. 9. A third periodic waveform 1215 represents the current used to induce additional oscillation of the second platform 425 about first axis 410, such as depicted in FIG. 10. Here, first periodic waveform 1205 is the same as first periodic waveform 1105 depicted in FIG. 11 and second periodic waveform 1210 is the same as second periodic waveform 1110 depicted in FIG. 11, but third periodic waveform 1215 is different.

In FIG. 12, third periodic waveform 1215 includes a first portion 1250 during part of first half-period 1225 of first periodic waveform 1205 and a second portion 1255 during part of second half-period 1230 of first periodic waveform 1205. First portion 1250 and second portion 1255 can be the same as corresponding portions of third periodic waveform 1115 depicted in FIG. 11, but third periodic waveform 1215 also includes a first transition portion 1260 overlapping parts of first half-period 1225 and second half-period 1230 and a second transition portion 1265 overlapping parts of second half-period 1230 and repeated first half-period 1235. On repetition, first transition portion 1260 can overlap parts of repeated first half-period 1235 and repeated second half-period 1240. Here, the amplitudes of third periodic waveform 1215 during first portion 1250 and second portion 1255 are depicted as being the same as one another.

First transition portion 1260 is 180 degrees phase shifted from first portion 1250, while second transition portion 1265 is 180 degrees phase shifted from second portion 1255. First transition portion 1265 and second transition portion 1265 are also 180 degrees phase shifted from one another. First portion 1250 and second portion 1255 are also 180 degrees phase shifted from one another. The amplitudes of third periodic waveform 1215 during first transition portion 1260 and second transition portion 1265 are depicted as being the same as one another, but different from the amplitudes first portion 1250 and second portion 1255. Such a configuration can be useful for, in effect, slowing down the resonant oscillation of second platform 425 near the end of each half-period and driving a phase-shifted resonant oscillation at the transition into the next half-period to generate a more optimal non-sinusoidal scan pattern for light reflected from reflector 440, for example.

Figure 13:
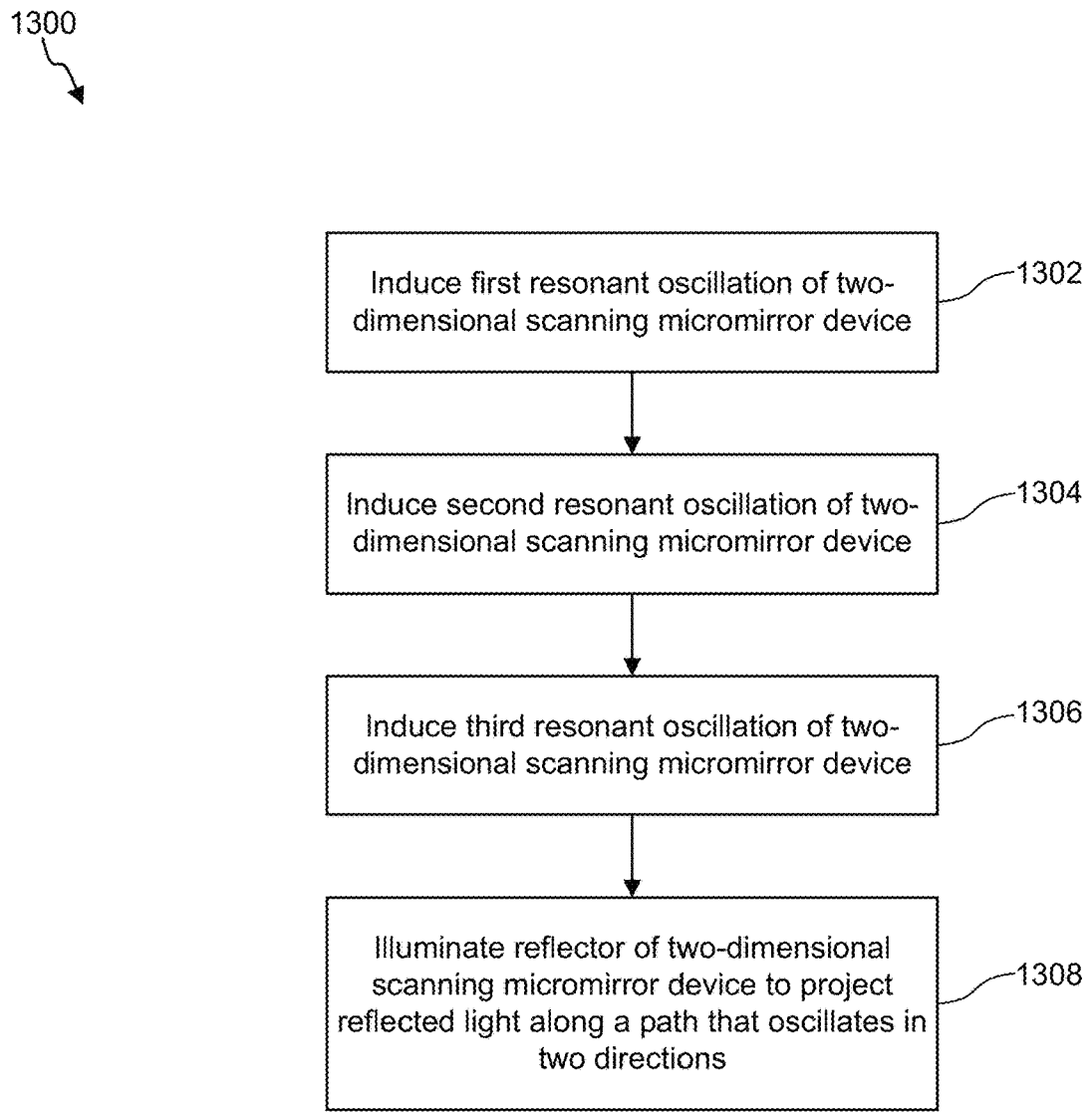
FIG. 13 provides an overview of an example method for projecting an image using a two-dimensional scanning micromirror device.

Turning next to FIG. 13, an overview of an example method 1300 is depicted. Method 1300 may correspond, for example, to a method of projecting an image, such as using a two-dimensional scanning micromirror device as described above. Method 1300 includes steps 1302, 1304, and 1306 where three different resonant oscillations of the two-dimensional scanning micromirror device are induced. These can correspond, for example, to a first resonant oscillation involving motion of at least first platform of the two-dimensional scanning micromirror device, a second resonant oscillation of at least a second platform of the two-dimensional scanning micromirror device, and a third resonant oscillation of at least the second platform of the two-dimensional scanning micromirror device. Although steps 1302, 1304, and 1306 are indicated as separate steps, it will be appreciated that these steps can occur simultaneous with one another.

The second resonant oscillation can have a frequency that is an integer or odd integer multiple of a frequency of the first resonant oscillation. The third resonant oscillation can have a frequency that is double the frequency of the second resonant oscillation. Inducing the resonant oscillations at steps 1302, 1304, and 1306 can involve using an electrostatic actuator, a piezoelectric actuator, or an electromagnetic actuator, for example. In the example of an electromagnetic actuator, a coil can be present on the two-dimensional scanning micromirror device, which can be positioned in a magnetic field oriented at an angle (e.g., a non-zero or non-perpendicular angle) relative to vibrational axes of the two-dimensional scanning micromirror device. Driving voltages or currents can include a first periodic waveform used to drive the first resonant oscillation, a second periodic waveform used to drive the second resonant oscillation, and a third periodic waveform used to drive the third resonant oscillation. The driving voltages or currents can include a sum of the first periodic waveform, the second periodic waveform, and the third periodic waveform, and can be provided by a voltage or current source.

While the two-dimensional scanning micromirror device is undergoing the resonant oscillations, a reflector of the two-dimensional scanning micromirror device can be illuminated, at step 1308, to project reflected light along a path that oscillates in two directions, such as along a non-sinusoidal path. The light can be from a controllable light source, which may be a multi-color light source (e.g., red, green, and blue), which can be switched in time to draw a projected image across a projection plan as the two-dimensional scanning micromirror device undergoes resonant oscillations.

A computing device may be incorporated as part of the previously described systems, such as image projection systems. Computing devices may be useful for performing aspects of the previously described methods. For example, computing devices may be useful for controlling modulation of a light beam. Computing devices may also be useful for controlling orientation of a scanning mirror. Computing devices may also be useful for controlling application of a voltage or current. An example computing device comprises hardware elements that may be electrically coupled via a bus (or may otherwise be in communication). The hardware elements may include one or more processors, including without limitation one or more general-purpose processors and/or one or more special-purpose processors (such as digital signal processing chips, graphics acceleration processors, video decoders, and/or the like); one or more input devices, which may include without limitation a mouse, a touchscreen, keyboard, remote control, voice input, and/or the like; and one or more output devices, which may include without limitation a display device, a printer, speaker, a servo, a linear actuator, a rotational actuator, etc.

The computing device may further include (and/or be in communication with) one or more non-transitory storage devices, which may comprise, without limitation, local and/or network accessible storage, and/or may include, without limitation, a disk drive, a drive array, an optical storage device, a solid-state storage device, such as a solid state drive ("SSD"), random access memory ("RAM"), and/or a read-only memory ("ROM"), which may be programmable, flash-updateable and/or the like. Such storage devices may be configured to implement any appropriate data stores, including without limitation, various file systems, database structures, and/or the like.

The computing device may also include a communications subsystem, which may include without limitation a modem, a network card (wireless or wired), an infrared communication device, a wireless communication device, and/or a chipset (such as a Bluetooth device, a Bluetooth Low Energy or BLE device, an 802.11 device, an 802.15.4 device, a WiFi device, a WiMax device, cellular communication device, etc.), a G.hn device, and/or the like. The communications subsystem may permit data to be exchanged with a network, other computer systems, and/or any other devices described herein. In many embodiments, the computing device will further comprise a working memory, which may include a RAM or ROM device, as described above.

The computing device also may comprise software elements, shown as being currently located within the working memory, including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the methods discussed above may be implemented as code and/or instructions executable by a computer (and/or a processor within a computer); in an aspect, then, such code and/or instructions may be used to configure and/or adapt a computer (or other device) to perform one or more operations in accordance with the described methods.

A set of these instructions and/or code may be stored on a non-transitory computer-readable storage medium, such as the non-transitory storage devices described above. In some cases, the storage medium may be incorporated within a computer system, such as the computing device described above. In other embodiments, the storage medium may be separate from a computer system (e.g., a removable medium, such as a compact disc, or a cloud- or network-based storage system), and/or provided in an installation package, such that the storage medium may be used to program, configure, and/or adapt a computer with the instructions/code stored thereon. These instructions may take the form of executable code, which is executable by the computing device or a component thereof and/or may take the form of source and/or installable code, which, upon compilation and/or installation on the computing device (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware may also be used, and/or particular elements may be implemented in hardware, software (including portable software, such as applets, etc.), or both. Further, connection to other computing devices such as network input/output devices may be employed.

As mentioned above, in one aspect, some embodiments may employ a computing device to perform methods in accordance with various embodiments. According to a set of embodiments, some or all of the procedures of such methods are performed by the computing device in response to a processor executing one or more sequences of one or more instructions (which may be incorporated into the operating system and/or other code, such as an application program) contained in the working memory. Such instructions may be read into the working memory from another computer-readable medium, such as one or more non-transitory storage devices. Merely by way of example, execution of the sequences of instructions contained in the working memory may cause the processor to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computing device, various computer-readable media may be involved in providing instructions/code to a processor for execution and/or may be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as a non-transitory storage device. Volatile media include, without limitation, dynamic memory, such as the working memory.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer may read instructions and/or code. Network-based and cloud-based storage systems may also be useful forms of computer-readable media.

Various forms of computer-readable media may be involved in carrying one or more sequences of one or more instructions to the processor for execution. Merely by way of example, the instructions may initially be carried on a magnetic disk and/or optical disc of a remote computer. A remote computer may load the instructions into its dynamic memory and send the instructions as signals over a transmission medium to be received and/or executed by the computing device.

The communications subsystem (and/or components thereof) generally will receive signals, and the bus then may carry the signals (and/or the data, instructions, etc. carried by the signals) to the working memory, from which the processor retrieves and executes the instructions. The instructions received by the working memory may optionally be stored on a non-transitory storage device either before or after execution by the processor.

It should further be understood that the components of computing device may be distributed. For example, some processing may be performed in one location using a first processor while other processing may be performed by another processor remote from the first processor. Optionally, systems described herein may include multiple independent processors that may exchange instructions or issue commands or provide data to one another. Other components of computing device may be similarly distributed. As such, a computing device may be interpreted as a distributed computing system that performs processing in multiple locations. In some instances, a computing device may be interpreted as a single computing device, such as a distinct laptop, desktop computer, or the like, depending on the context.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A two-dimensional scanning micromirror device comprising:
   a base;
   a first platform coupled to the base by a plurality of first support flexures; and
   a second platform coupled to the first platform by a plurality of second support flexures, the second platform including a reflector;
   wherein
   the first platform is oscillatable about a first axis; and
   the second platform is oscillatable about a second axis orthogonal to the first axis;
   the first platform, the second platform, and the plurality of second support flexures together exhibit a first resonance having a first frequency, the first resonance corresponding to oscillatory motion of at least the first platform, the second platform, and the plurality of second support flexures about the first axis;
   the first platform, the second platform, and the plurality of second support flexures together exhibit a second resonance having a second frequency, the second frequency greater than the first frequency, and the second resonance corresponding to oscillatory motion of at least the second platform about the second axis; and
   the first platform, the second platform, and the plurality of second support flexures together exhibit a third resonance having a third frequency, the third frequency being double the second frequency, and the third resonance corresponding to oscillatory motion of at least the second platform about the first axis.

2. The two-dimensional scanning micromirror device of claim 1, wherein the third frequency is an integer or odd-integer multiple of the first frequency.

3. The two-dimensional scanning micromirror device of claim 1, wherein the first platform is suspended from the base by the plurality of first support flexures and wherein the second platform is suspended from the first platform by the plurality of second support flexures.

4. The two-dimensional scanning micromirror device of claim 1, wherein the first support flexures comprise resilient members having structures adapted for oscillatory motion of the first platform about the first axis at the first frequency.

5. The two-dimensional scanning micromirror device of claim 1, wherein the second support flexures comprise resilient members having structures adapted for oscillatory motion of the second platform about the second axis at the second frequency and for oscillatory motion of the second platform about the first axis at the third frequency.

6. The two-dimensional scanning micromirror device of claim 1, further comprising an electrostatic or electromagnetic actuator coupled to the first platform or the second platform for inducing resonant oscillations of the first platform or the second platform.

7. The two-dimensional scanning micromirror device of claim 1, further comprising a magnetic field source arranged to provide a magnetic field oriented non-orthogonal with both the first axis and the second axis.

8. The two-dimensional scanning micromirror device of claim 1, wherein the second platform comprises a conducting coil arranged to apply magnetic forces to the second platform about the first axis and about the second axis.

9. A method of projecting an image, the method comprising:
   providing a two-dimensional scanning micromirror device;
   inducing a first resonant oscillation of the two-dimensional scanning micromirror device at a first frequency;
   inducing a second resonant oscillation of the two-dimensional scanning micromirror device at a second frequency, wherein the second frequency is an integer multiple of the first frequency;

inducing a third resonant oscillation of the two-dimensional scanning micromirror device at a third frequency, wherein the third frequency is double the second frequency; and illuminating a reflector of the two-dimensional scanning micromirror device with a light source to generate reflected light.

10. The method of claim 9, wherein the first resonant oscillation corresponds to oscillatory motion of a reflector of the two-dimensional scanning micromirror device about a first axis, wherein the second resonant oscillation corresponds to oscillatory motion of the reflector about a second axis orthogonal to the first axis, and wherein the third resonant oscillation corresponds to oscillatory motion of the reflector about the first axis.

11. The method of claim 10, wherein the reflected light is projected along a path that oscillates in a first direction perpendicular to the first axis and in a second direction perpendicular to the second axis.

12. The method of claim 11, wherein the path is a non-sinusoidal path.

13. The method of claim 9, wherein inducing a resonant oscillation comprises applying a driving signal to an electrostatic or electromagnetic actuator coupled to the two-dimensional scanning micromirror device, wherein the driving signal has a periodic waveform characterized by a corresponding driving frequency.

14. The method of claim 9, wherein inducing a resonant oscillation comprises applying a driving signal to a conducting coil of the two-dimensional scanning micromirror device, wherein the driving signal has a periodic waveform characterized by a corresponding driving frequency.

15. The method of claim 9, wherein a driving signal for inducing the first resonant oscillation, inducing the second resonant oscillation, and inducing the third resonant oscillation comprises a sum of:
a first periodic waveform characterized by a first driving frequency,
a second periodic waveform characterized by a second driving frequency, and
a third periodic waveform characterized by a third driving frequency.

16. The method of claim 15, wherein the first driving frequency is equal to or about the first frequency, wherein the second driving frequency is equal to or about the second frequency, and wherein the third driving frequency is equal to or about the third frequency.

17. The method of claim 15, wherein the first periodic waveform includes a first half-period and a second half-period, and wherein the third periodic waveform is phase shifted by 180 degrees during the first half-period relative to the second half-period.

18. The method of claim 15, wherein the first periodic waveform includes a first half-period and a second half-period, and wherein the third periodic waveform includes a first portion during part of the first half-period, a second portion during part of the second half-period, and a transition portion overlapping parts of the first half-period and the second half-period, wherein the transition portion and the second portion are phase shifted by 180 degrees relative to the transition portion, wherein the first portion and the second portion both have a first amplitude, and wherein the transition portion has a second amplitude greater than the first amplitude.

19. The method of claim 18, wherein the transition portion is a first transition portion, wherein the third periodic waveform further includes a second transition portion overlapping parts of the second half-period and a repeated first half-period, wherein the second transition portion is phase shifted by 180 degrees relative to the first transition portion, and wherein the second transition portion has the second amplitude.

20. An image projection system comprising:
a two-dimensional scanning micromirror device, the two-dimensional scanning micromirror device comprising
a base;
a first platform coupled to the base by a plurality of first support flexures; and
a second platform coupled to the first platform by a plurality of second support flexures, the second platform including a reflector;
wherein
the first platform is rotatable about a first axis; and
the second platform is rotatable about a second axis orthogonal to the first axis;
the first platform, the second platform, and the plurality of second support flexures together exhibit a first oscillatory resonance having a first frequency, the first oscillatory resonance corresponding to rotational motion of at least the first platform, the second platform, and the plurality of second support flexures about the first axis;
the first platform, the second platform, and the plurality of second support flexures together exhibit a second oscillatory resonance having a second frequency, the second frequency being an integer multiple of the first frequency, and the second oscillatory resonance corresponding to rotational motion of at least the second platform about the second axis; and
the first platform, the second platform, and the plurality of second support flexures together exhibit a third oscillatory resonance having a third frequency, the third frequency being double the second frequency, and the third oscillatory resonance corresponding to rotational motion of at least the second platform about the first axis; and
a light source arranged in optical communication with the reflector of the two-dimensional scanning micromirror device.

* * * * *